US006254030B1

United States Patent
Sloan, Jr. et al.

(10) Patent No.: US 6,254,030 B1
(45) Date of Patent: Jul. 3, 2001

(54) VEHICLE GUIDANCE SYSTEM FOR GUIDED MISSILES HAVING ADAPTIVE TRAJECTORY BIAS

(75) Inventors: Marlin A. Sloan, Jr.; Glen L. Francisco, both of Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 06/552,943

(22) Filed: Nov. 17, 1983

(51) Int. Cl.[7] ....................................................... F41B 7/00
(52) U.S. Cl. ............................................................. 244/3.21
(58) Field of Search ................... 244/3.21, 3.15

(56) References Cited

U.S. PATENT DOCUMENTS

| 3,575,362 | * | 4/1971 | Hammond et al. ............... 244/3.2 |
| 3,624,367 | * | 11/1971 | Hamilton et al. .................. 244/3.21 |
| 3,946,968 | * | 3/1976 | Stallard ............................... 244/3.21 |
| 3,984,072 | * | 10/1976 | Von Pragenau et al. .......... 244/3.21 |
| 3,998,409 | * | 12/1976 | Pistiner ............................... 244/3.21 |
| 4,062,509 | * | 12/1977 | Muhlfelder et al. ............... 244/3.2 |
| 4,234,142 | * | 11/1980 | Yost et al. .......................... 244/3.21 |

* cited by examiner

Primary Examiner—Charles T. Jordan
Assistant Examiner—Denise J. Buckley
(74) Attorney, Agent, or Firm—Burns, Doane, Swecker & Mathis, LLP

(57) ABSTRACT

Method and apparatus are described for improving the impact angle between a missile and stationary or moving target in the presence of stationary or adverse wind conditions. A triggered bias detector provides an enabling signal to a bias resolver when the pitch line of sight rate of a missile exceeds a predetermined level. The bias resolver supplies first and second bias signals to the pitch forward guidance loop and yaw forward guidance loop in response to the detected pitch line of sight rate. The missile is given a lofting trajectory in response to the applied bias signal as it closes on the target. Impact angles of a more nearly vertical condition over a wide range of missile/target acquisition geometric conditions are obtained using this triggered bias technique over conventional constant gravity bias proportional guidance techniques.

10 Claims, 3 Drawing Sheets

TRIGGER BIAS AND RESOLVER SIGNAL FLOW DIAGRAM

LINE-OF-SIGHT RATE SENSITIVITY TO TARGET OFFSET
FROM BORE SIGHT $$\dot{\lambda} = \frac{X_R \dot{Z}_R - Z_R \dot{X}_R}{R_S^2}$$

where $X_R = X_T - X_M$ ; $\dot{X}_R = \dot{X}_T - \dot{X}_M$ $Z_R = Z_T - Z_M$ ; $\dot{Z}_R = \dot{Z}_T - \dot{Z}_M$ $R_S = (X_R^2 + Z_R^2)^{\frac{1}{2}} =$ SLANT RANGE

VEHICLE GUIDANCE SYSTEM FOR GUIDED MISSILES HAVING ADAPTIVE TRAJECTORY BIAS

The present invention is related to guidance systems for terminally guided missiles. Specifically, apparatus and method are provided for biasing the trajectory of a guided missile to increase the top attack angle for certain target conditions.

Guided missile weapons have been developed which include proportional guidance in two planes of movement. The proportional guidance control for these systems develops control signals for guiding the missile to a target based upon a sensed line of sight rate with respect to the target. The error information for driving the multiaxis proportional guidance system is developed from a seeker which senses infrared energy, laser energy, radio frequency energy or millimeter wave energy emitted or reflected by the target.

Studies conducted by the inventors have shown that the effectiveness of a terminally guided missile with a shallow approach angle requires that the angle of impact be greater than 45° for many target conditions. The higher angle provides for a greater target penetration by impacting areas of the target such as the engine compartment or exit hatch of a military tank where armor protection is necessarily weak. For other target conditions, such as closing targets moving towards the missile, a lofting trajectory which results in a high angle of attack and large seeker gimbal angles, is undesirable. In view of the foregoing design requirements, a bias to the missile trajectory is desirable for those target conditions which require a lofting terminal trajectory. The bias, however, should not be constant, but only supplied for target conditions which require an improved angle of impact based on sensed line of sight rate with respect to the target, increasing the probability of total target destruction. The condition for establishing the bias should be based on a sensed in-flight target to missile geometric relationship.

SUMMARY OF THE INVENTION

An object of the present invention is to provide trajectory shaping resulting in high impact angles for a terminally guided missile system.

A more specific object of the invention is to provide a trajectory bias operative in response to a sensed missile-target geometric relationship.

These and other objects are provided by apparatus and methods which, in response to a sensed flight condition, biases the missile terminal trajectory to achieve a high impact angle with the target. A guided missile having proportional guidance control developed from a sensed relative target position and velocity is equipped to sense one flight parameter. A bias to the trajectory is established when the sensed flight parameter exceeds a predetermined minimum. Impact angles of a more nearly vertical condition over a wide range of missile/target acquisition geometric conditions are obtained using this triggered bias technique over conventional constant gravity bias proportional guidance technology.

In a preferred embodiment of the invention, the sensed parameter is the missile pitch line of sight rate which triggers first and second bias levels into summation with the missile pitch and yaw forward guidance control signals. The missile bias levels are proportional to the sine and cosine of the roll angle which is detected by on-board instruments during the initial target acquisition phase of the trajectory. The bias levels may also be combined with a gravity bias parameter to further modify the trajectory based upon a predetermined gravity influence related to the missile aerodynamic coefficients.

DESCRIPTION OF THE PREFERRED EMBODIMENT

Figure 1:
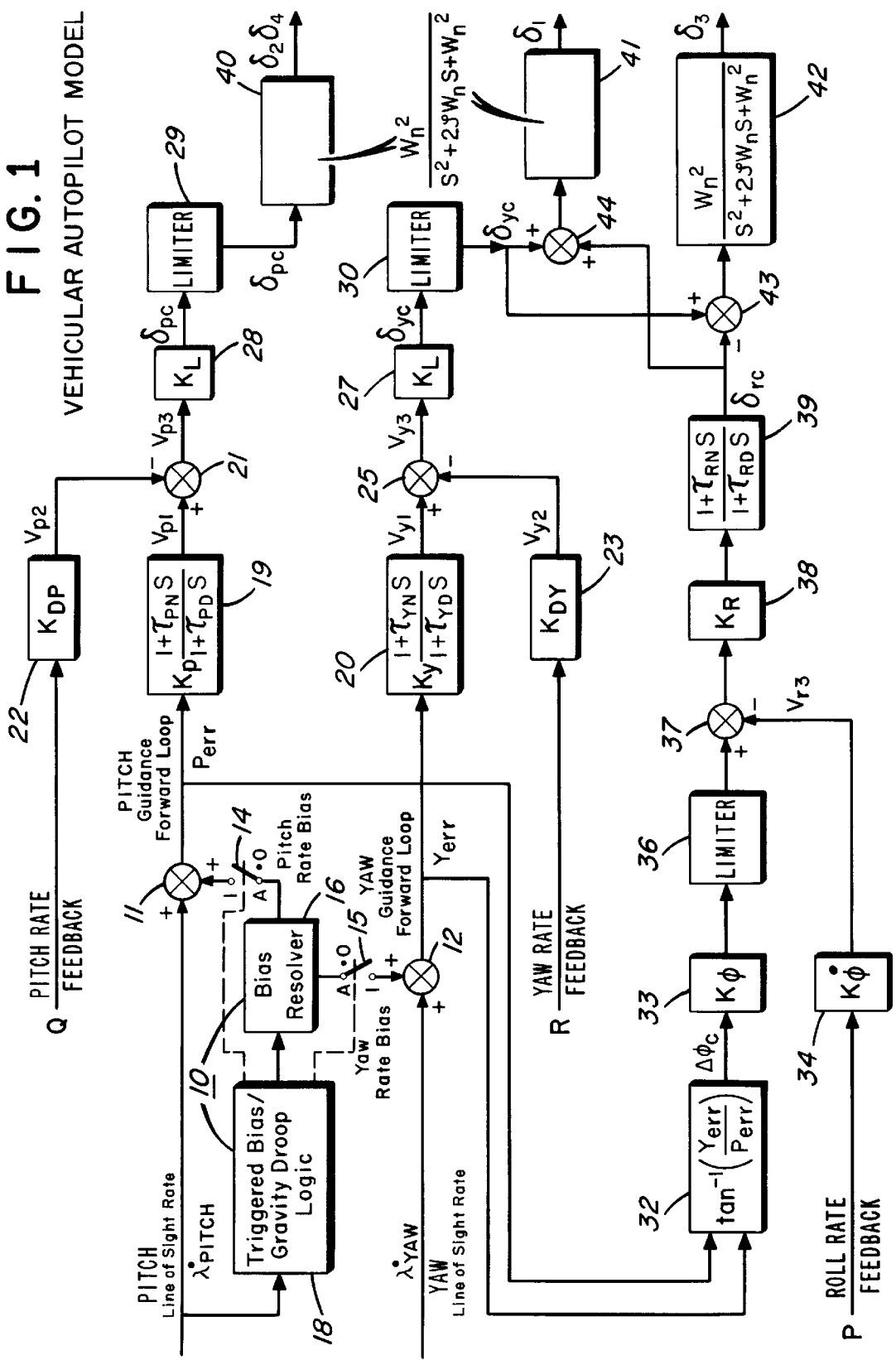
FIG. 1 is a block diagram illustrating the proportional guidance of a guided missile of a preferred embodiment of the invention.

Referring now to FIG. 1, there is shown a block diagram or a proportional guidance system incorporating the preferred embodiment of the invention. The guidance system includes three axis rate control of a guided missile in the pitch, yaw and roll planes. Signals which are supplied to the control system from a conventional seeker head indicative of the relative position of the target and missile include:

Pitch $\dot{\lambda}$=pitch angle line of sight rate (°/sec)

Yaw $\dot{\lambda}$=yaw angle line of sight rate (°/sec)

Other conventional signals which participate in control of the missile include pitch rate and yaw rate feedback signals Q and R generated from on-board gyroscopic instruments.

Fin actuators 40, 41 and 42 are represented by second order Laplace functions and receive drive commands to reduce the angular error between the missile position and target position in the three guidance planes to zero, thus impacting a sensed target.

The guidance system of FIG. 1 is represented in conventional control system functional blocks and will be presently explained in terms of these functional blocks. The system may be realized with hardware components having a transfer function corresponding to each functional block, but may also be advantageously implemented by microcomputer techniques which perform in software the functional blocks of FIG. 1. Sampling of the input seeker signals, performing the required software functions for each functional block, and supplying multiplexed digital signals to each fin control input 40, 41 and 42 are techniques known in the control system field in which the present invention may be implemented and will not be further described.

Figure 2:
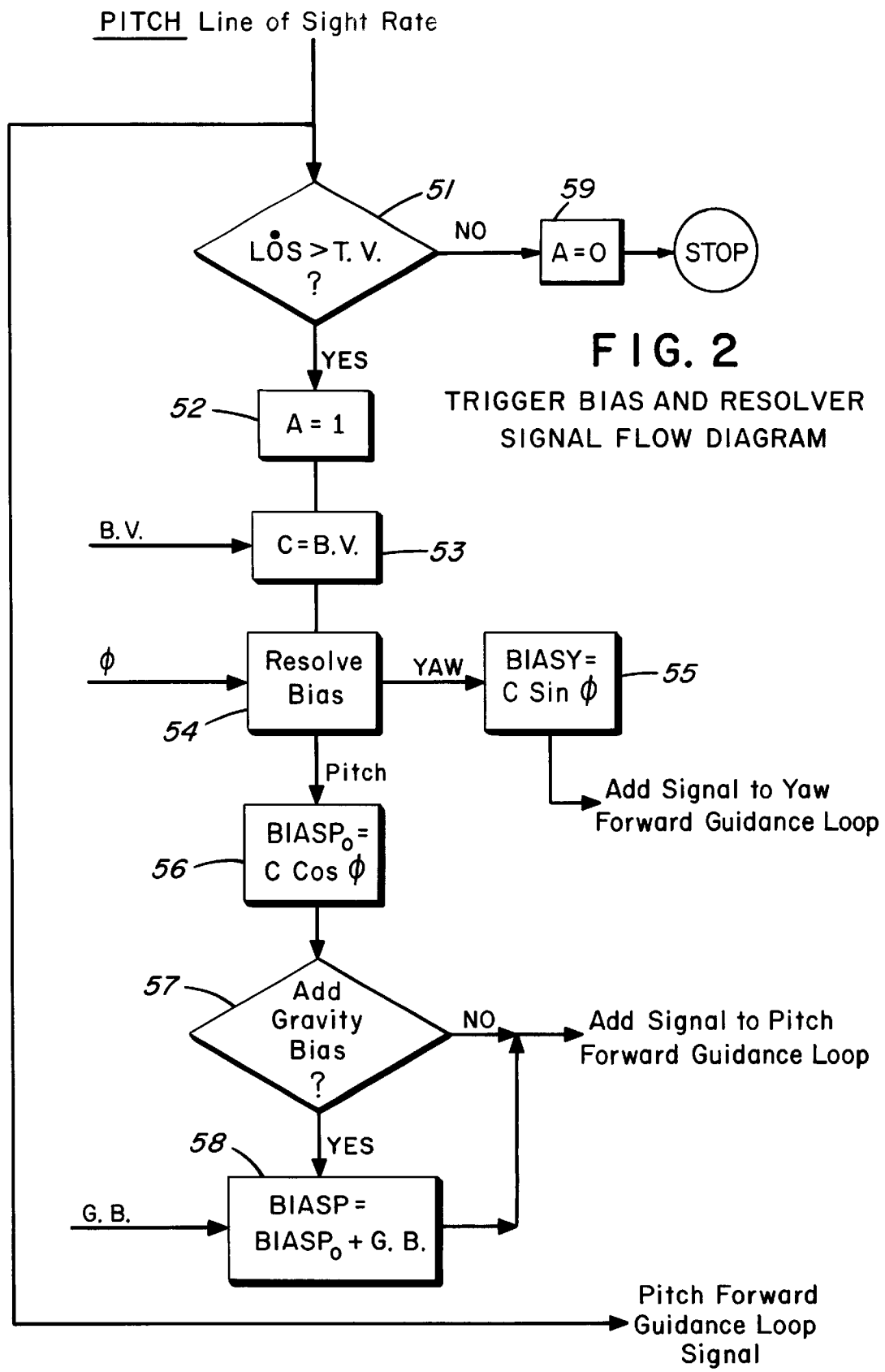
FIG. 2 is a flow diagram more specifically describing the bias signal generating technique of the preferred embodiment.

The control system of FIG. 2 includes a rate bias signal generator 10 which provides a pitch rate bias signal and yaw rate bias signal defined as BIASP $\triangleq$ Trigger Bias Value×COS($\phi$ref)

BIASY $\triangleq$ Trigger Bias Value×SIN($\phi$ref)

where $\phi$ ref is the roll reference angle of the missile at target acquisition, detected during the initial portion of the trajectory. The trigger bias value (B.V.) is typically 3°/sec. A resolver 16 supplies each of these signals to the summing junctions 11, 12 when switches 14, 15 are closed. Switches 14 and 15 are closed and resolver 16 enabled when the PLOS rate is detected to be greater than or equal to a preselected threshold value, and opened for PLOS rates less than the threshold value. This threshold value is unique for different missile-target geometric and aerodynamic configurations. The threshold value, T.V., may be −1.0°/ sec. The summing junctions 11 and 12 receive seeker pitch line of sight rate signals, PLOS rate, and yaw seeker line of sight signals, YLOS rate, for deriving pitch and yaw proportional error signals Perr and Yerr.

The pitch and yaw error signals, Perr and Yerr, are applied to pitch and yaw compensation circuits 19, 20. The compensation networks provide a transfer function of $$K_P 1 + \frac{\tau_{PN} S}{1 + \tau_{PD} S}; K_Y 1 + \frac{\tau_{YN} S}{1 + \tau_{YD} S}$$

where $K_P$ = pitch guidance gain, $K_Y$ = yaw guidance gain, $\tau_{PN}$ = pitch time constant numerator, $\tau_{PD}$ = pitch time constant denominator, $\tau_{YN}$ = yaw time constant numerator, $\tau_{YD}$ = yaw time constant denominator.

The compensated error signals are combined in summing junctions 21, 25 with feedback signals from amplifiers 22 and 23 corresponding to the pitch rate and yaw rate, $V_{P2}$ and $V_{Y2}$, detected by on-board gyroscopic sensors. The combined signals from junctions 21, 25 are further gain normalized in networks 27, 28 to provide control signals δpc and δyc. Limiters 29 and 30 provide limiting to signals δpc and δyc to prevent a control command from being applied to fin deflection controls 40, 41 which exceeds the capability of the fin controls to respond. The limited output signal from limiter 30 is combined with a portion of the roll control signal from compensation network 39 in summing junction 44. The resulting signal is applied to fin deflection control 41 as the yaw control signal.

Complementing the pitch and yaw proportional guidance controls is a roll guidance loop. The roll guidance control derives a roll error signal from the pitch and yaw error signals, Perr and Yerr, by the function of block 32, $$\tan^{-1} \frac{(Yerr)}{(Perr)}$$

to derive the roll error $\Delta\phi_c$. The roll error is further gain normalized by amplifier 33 having a gain of $K_\phi$. The resulting signal is applied to limiter 36 which also limits the magnitude of its respective control signal to a level within the response of fin deflection control 42. The limited signal is further subtractively combined in junction 37 with a gain normalized feedback roll rate $V_{R3}$. The feedback signal is representative of the roll rate of the vehicle gain normalized by the factor $K_\phi$ of network 34. The drive signal produced by junction 37 is further gain modified by K in amplifier 38. A compensation network 39 having the following transfer function receives the gain normalized signal:

$$\frac{1 + \tau_{RN} \times S}{1 + \tau_{RD} \times S}$$

where $\tau_{RN}$ is the roll forward loop numerator time constant and $\tau_{RD}$ is the roll forward loop denominator time constant. The compensated drive signal δrc is summed negatively with the limited yaw control signal in junction 43 to generate the fin control drive signal.

Figure 3:
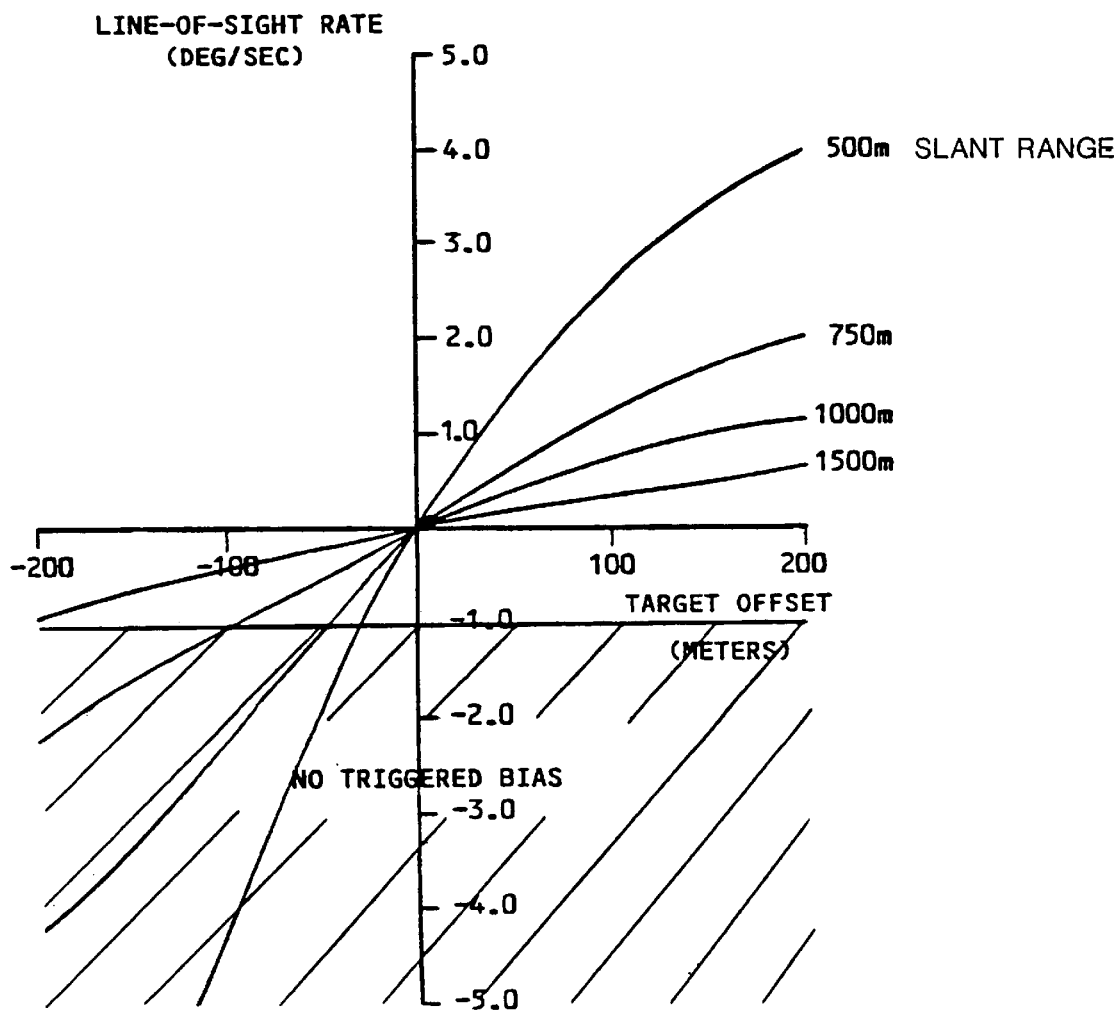
FIG. 3 is an illustration of the LOS rate of a terminally guided missile as a function of the geometric relationship between the missile and target.

The foregoing three axis proportional guidance system responds to the relative target position and velocity such as to reduce the Perr and Yerr error signals as the missile approaches the target. The trajectory is biased to provide a high impact angle with the target when the pitch line of sight rate exceeds a predetermined rate as determined by trigger bias/logic circuit 18. There is a fundamental relationship between PLOS rate and the target slant range and target offset. Referring to FIG. 3, there is shown the fundamental relationship between the LOS rate of one type of terminally guided missile such is ejected from a terminally guided warhead, and the geometric position of the missile and target. The missile coordinates are $X_M$ and $Z_M$, and the target coordinates are $X_T$, $Z_T$. The slant range to the target $R_s$ is defined as the straight line distance to the target. The horizontal distance, or ground distance, from missile to target is the referred target offset. $X_r$ and the vertical distance from the missile to the target is the reference target offset $Z_r$.

Studies have shown that the larger seeker gimbal angles and angle rates experienced for closing targets, those down range from the missile shown as having a negative target offset, render it unadvisable to bias the trajectory. As FIG. 1 illustrates, this condition occurs for an LOS rate less than −1.0°/sec for this particular missile. Those targets which produce a PLOS rate of less than −1°/second have, by geometry, a range and offset which is not within the missile's capability to produce a high impact angle.

Although FIG. 3 demonstrates the composite LOS rate, further studies indicate that the pitch line of sight rate is similarly indicative of target conditions which should not be biased.

Targets that have a PLOS rate greater than −1°/second have sufficient range and altitude to permit the trajectory to be biased to achieve a higher impact angle. Thus, the bias is triggered for these PLOS rates, and switches 14 and 15 are closed. For rates less than −1°/sec, the switches are opened.

With the bias signals BIASP and BIASY applied for those PLOS rates in excess of −1°/second, a constant bias signal is applied to the pitch and yaw forward guidance loops by the closure of switches 14 and 15. Of course, it is possible, within the scope of the present invention, to include non-fixed values of bias selected in response to flight parameters of the missile.

The system operates as a smart missile by sensing the need for trajectory biasing at target acquisition and then adding a biasing signal to the pitch and yaw guidance control. The triggered bias is also smart in that during the flight of the missile, if the PLOS rate drops below −1°/sec., the bias is removed, avoiding excess arcing of the trajectory.

The foregoing bias signals may also include a signal term for providing a gravity bias signal to the forward loop. Those skilled in missile control systems will recognize that every vehicle will be influenced by gravity differently depending on its trajectory parameters. To offset the effect of gravity on the pitch plane, a signal biasing against the effect of gravity may be added to the pitch forward guidance control signal along with a BIASP signal. This gravity bias rate signal may also be triggered in response to a given PLOS rate.

The foregoing control system, whether implemented by computer or hardwired networks, may be implemented with the parameters of Table 1.

TABLE 1

VEHICULAR AUTOPILOT MODEL DATA DESCRIPTION

| Symbol | Description | Units | Default Value |
|---|---|---|---|
| $K_P$ | Pitch Guidance Gain | Sec | 0.8 |
| $K_y$ | Yaw Guidance Gain | Sec | 1.6 |
| $K_{DP}$ | Pitch Rate Feedback Gain | Sec | 0.04 |
| $K_L$ | Pitch or Yaw Forward Loop Gain | Rad | 1.0 |
| $K_R$ | Roll Forward Loop Gain | Rad | 1.0 |
| $\tau_{RN}$ | Roll Forward Loop Numerator Time Constant | Sec | 1.0 |
| $\tau_{RD}$ | Roll Forward Loop Denominator Time Constant | Sec | 1.0 |
| G.B. | Gravity Bias | Deg/Sec | −1.0 |
| $K_\phi$ | Roll Attitude Gain | Rad/Rad | 0.06 |
| $K_{\dot\phi}$ | Roll Rate Feedback Gain | Rad/Rad/Sec | 0.01 |
| $K_{DY}$ | Yaw Rate Feedback Gain | Sec | 0.04 |
| B.V. | Trigger Rate Bias Value | Deg/Sec | 3.0 |
| T.V. | Trigger Rate Bias Threshold | Deg/Sec | −1.0 |
| $\tau_{PN}$ | Pitch Command Numerator Time Constant | Sec | 1.0 |
| $\tau_{PD}$ | Pitch Command Denominator Time Constant | Sec | 1.0 |
| $\tau_{YN}$ | Yaw Command Numerator Time Constant | Sec | 1.0 |
| $\tau_{YD}$ | Yaw Command Denominator Time Constant | Sec | 1.0 |

Referring to FIG. 2, there is shown a block diagram of programming steps which will permit implementation of the rate bias signal generator 10 of FIG. 1. The pitch line of sight rate, PLOS, from the seeker is detected in step 51 and compared with a triggered value rate, T.V., which is preferably −1.0°/second. If the PLOS rate is greater than −1.0°/second, a bias condition is indicated by step 52, A=1. If the PLOS rate is less than or equal to −1°/sec, no bias condition is indicated by step 59, A=0, and no bias is applied to the system. An initial bias value B.V. which is preferably 3.0°/second is selected in step 53. In step 54, the roll reference angle determined from on-board instrumentation at target acquisition is detected, and the BIASY and BIASP levels are subsequently determined in steps 55 and 56.

The gravity bias may be added by setting a control flag 57 which will combine a bias value G.B., previously determined from the vehicular characteristics, to the $BIASP_0$ level determined in step 56. The resulting bias signals are added to the summing junctions 11, 12 of FIG. 1.

Thus, there has been shown a proportional guidance system in terms of classical control system parameters which will bias the missile trajectory under certain target conditions to achieve a high impact angle with a moving or stationary target in the presence of stationary or adverse winds. Those skilled in the art will recognize yet other embodiments defined in terms of the claims which follow.

What is claimed is:

1. In a guided missile system of the type including a seeker for providing pitch and yaw rate control signals in response to a sensed relative target position and motion, an apparatus for providing a top attack trajectory to said missile comprising:

means for generating line of sight angular rate pitch and yaw signals representing the relative angular position change between said missile and a target;

a bias resolver connected to apply a bias signal to said pitch and yaw control signals for biasing said missile trajectory to provide a high impact angle with said target; and trigger means connected to sense a condition indicative of the geometric position of said missile with respect to said target, said trigger means connected to enable said resolver when said geometric position is favorable for a top attack trajectory whereby said missile trajectory is biased to provide an optimum attack angle.

2. In a guided missile system of the type responding to a sensed relative target position and motion, said missile generating pitch and yaw rate control signals in response to detected pitch and yaw rate signals, apparatus for improving the attack angle of said missile comprising:

a triggered bias detector for providing an enabling signal in response to a pitch line of sight rate signal which exceeds a predetermined level;

a bias resolver for providing a pitch rate bias signal and yaw rate bias signal in response to said enabling signal; and means for combining said pitch rate bias signal and said yaw rate bias signal with respective of said pitch rate control signals and said yaw rate control signals whereby said guided missile trajectory is biased in response to a pitch rate signal which exceeds said predetermined level.

3. The guided missile system of claim 2 wherein said predetermined level of line of sight rate is greater than minus one degree per second.

4. The guided missile system of claim 2 wherein said means for combining comprises:

a first summing network for combining said pitch rate bias signal with said pitch rate signal whereby said pitch control signal is formed; and, a second summing network for combining said yaw rate bias signal with said yaw rate signal to form said yaw control signal.

5. The apparatus of claim 2 wherein said pitch and yaw rate bias signals are proportioned to the cosine of a detected roll reference angle, and the sine of said detected roll reference angle, respectively.

6. The apparatus of claim 2 wherein said apparatus combines with said pitch bias signal a gravity bias signal.

7. A method for increasing the impact angle of a guided missile of the type having an autopilot tracking system generating pitch and yaw commands for a deflector assembly comprising:

determining the line of sight pitch rate of the missile;

generating a first bias signal for combining with said pitch command when said line of sight pitch rate exceeds a predetermined magnitude; and generating a second bias signal for combining with said yaw commands;

whereby said missile trajectory during its terminal phase is biased to provide an increased angle of impact.

8. The method of claim 7 further comprising the steps of:

determining an initial roll angle φ for said missile when said target is initially acquired;

generating said first pitch bias signal proportional to the product of the cosine of said roll reference angle φ and a constant bias value; and generating said second yaw bias signal proportional to the product of the sine of said roll angle φ and said constant bias value.

9. The method of claim 8 further comprising:

generating a gravity bias signal; and combining said gravity bias signal with said first bias signal whereby said pitch command is gravity compensated.

10. The apparatus of claim 1 wherein said condition indicative of said geometric position is a flight parameter of said missile.

* * * * *